(12) United States Patent
Tsai

(10) Patent No.: US 8,261,888 B2
(45) Date of Patent: Sep. 11, 2012

(54) BRAKE LEVER WITH A MECHANISM FOR QUICKLY LOOSENING BRAKE CABLE OF RACING BICYCLE

(75) Inventor: Szu-Fang Tsai, Changhua (TW)

(73) Assignee: Tektro Technology Corporation, Changhua (TW)

( * ) Notice: Subject to any disclaimer, the term of this patent is extended or adjusted under 35 U.S.C. 154(b) by 296 days.

(21) Appl. No.: 12/787,419

(22) Filed: May 26, 2010

(65) Prior Publication Data

US 2011/0290063 A1    Dec. 1, 2011

(51) Int. Cl.
*B62L 3/00* (2006.01)

(52) U.S. Cl. ............... 188/24.22; 188/24.11; 188/24.19; 74/502.2

(58) Field of Classification Search ............... 188/24.22, 188/24.11, 24.12, 24.19, 2 D; 74/488, 489, 74/500.5, 501.6, 502.2, 522
See application file for complete search history.

(56) References Cited

U.S. PATENT DOCUMENTS

| | | | | |
|---|---|---|---|---|
| 5,660,082 A | * | 8/1997 | Hsieh | 74/502.2 |
| 6,161,448 A | * | 12/2000 | Wang | 74/502.2 |
| 6,651,523 B2 | * | 11/2003 | Chou | 74/502.2 |
| 7,000,739 B2 | * | 2/2006 | Ciamillo | 188/24.22 |
| 7,628,094 B2 | * | 12/2009 | Owyang | 74/500.5 |
| 8,006,810 B2 | * | 8/2011 | Tsai | 188/24.22 |

\* cited by examiner

*Primary Examiner* — Pamela Rodriguez

(57) ABSTRACT

A brake apparatus for a racing bicycle includes a housing mounted on either handlebar and comprising an internal recess; a brake lever pivotably secured to the housing and having one end pivotably disposed in the recess; a spring depressible detent rod slidably disposed in the brake lever and comprising a head on an outer surface of the brake lever, an annular flange, and an annular groove between the flange and the head; a brake cable having one end attached to the brake lever and the other end attached to a brake; and a locking member having one end urged against the flange. Pushing the head to cause one end of the locking member to fall into the groove and cause one end of the brake lever to fall into the recess will loosen the brake cable.

1 Claim, 8 Drawing Sheets

BRAKE LEVER WITH A MECHANISM FOR QUICKLY LOOSENING BRAKE CABLE OF RACING BICYCLE

BACKGROUND OF THE INVENTION

1. Field of Invention

The invention relates to bicycle brake systems and more particularly to a brake lever of a racing bicycle having a spring depressible detent rod for quickly loosening a brake cable by pressing so that a subsequent wheel replacement can be facilitated.

2. Description of Related Art

Typically, brake performance is the most important factor in designing a bicycle brake. A brake cable which can be quickly loosened for facilitating a subsequent wheel change is also under consideration. A typical brake of a racing bicycle comprises two opposite brake pads at both ends of a caliper brake respectively. Driver may press the brake lever on the handlebar to move the brake pads toward each other to clamp the wheel rim until it is slowed or stopped.

It is understood that a distance between a wheel rim and either brake pad is small. Also, the cross-section of a tire has a diameter greater than a width of the wheel rim. Hence, for replacing a worn or broken wheel a person has to first loosen the brake cable to increase the distance between two brake pads. Thereafter, the person can change the wheel. However, this is time consuming. Thus, the need for improvement exists.

SUMMARY OF THE INVENTION

It is therefore one object of the invention to provide a brake apparatus for a racing bicycle, the racing bicycle including handlebars and a brake, the brake apparatus comprising a housing mounted on the handlebars and comprising an internal recess; a brake lever pivotably secured to the housing and having one end pivotably disposed in the recess; a spring depressible detent rod slidably disposed in the brake lever and comprising a head on an outer surface of the brake lever, an annular flange, and an annular groove between the flange and the head; a brake cable having one end attached to the brake lever and the other end attached to the brake; and a locking member having one end urged against the flange; whereby pushing the head to cause one end of the locking member to fall into the groove and cause one end of the brake lever to fall into the recess will loosen the brake cable.

The above and other objects, features and advantages of the invention will become apparent from the following detailed description taken with the accompanying drawings.

DETAILED DESCRIPTION OF THE INVENTION

Figure 1:
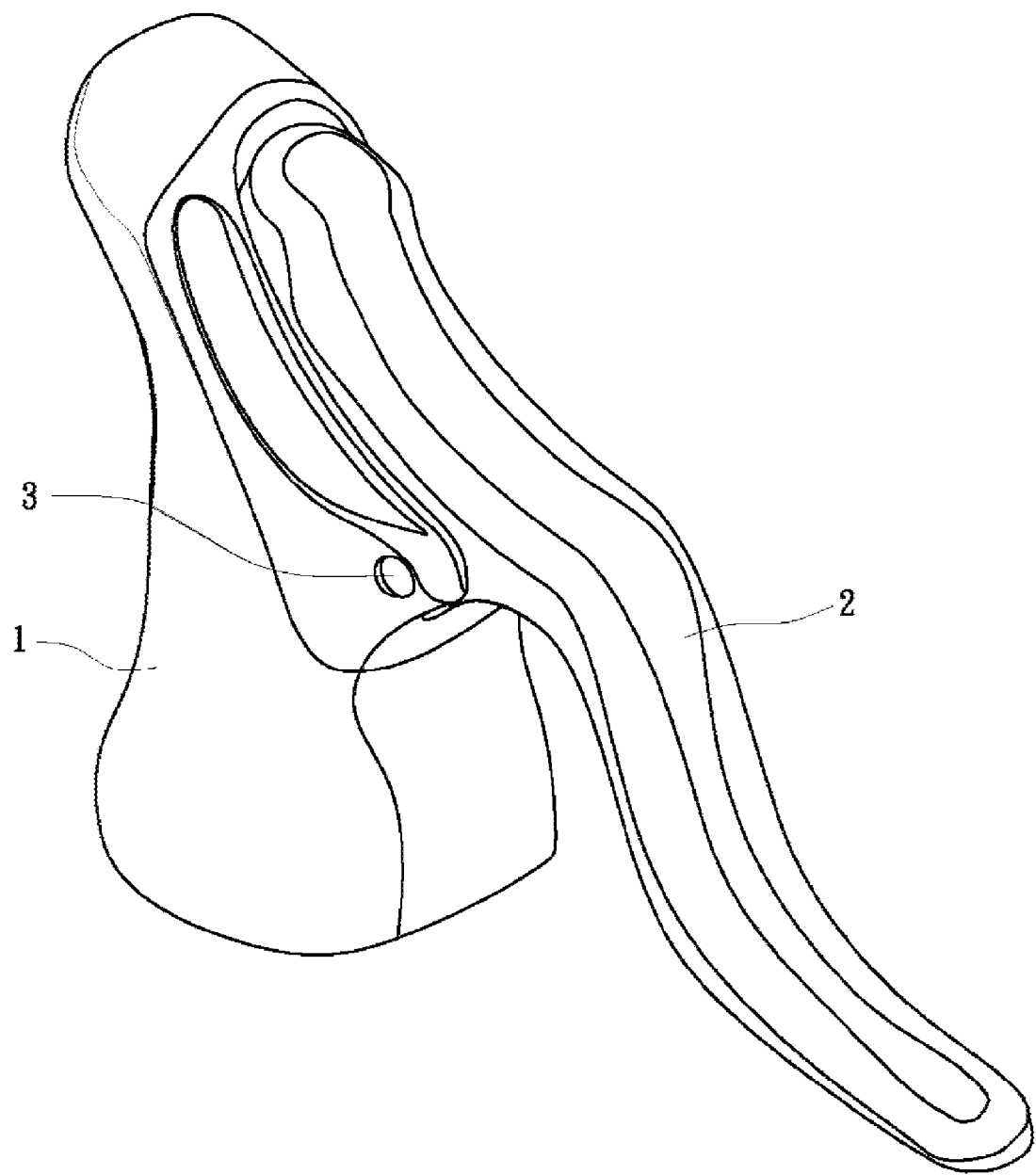
FIG. 1 is a perspective view of a brake lever of a racing bicycle incorporating a mechanism for quickly loosening a brake cable according to the invention.
Figure 2:
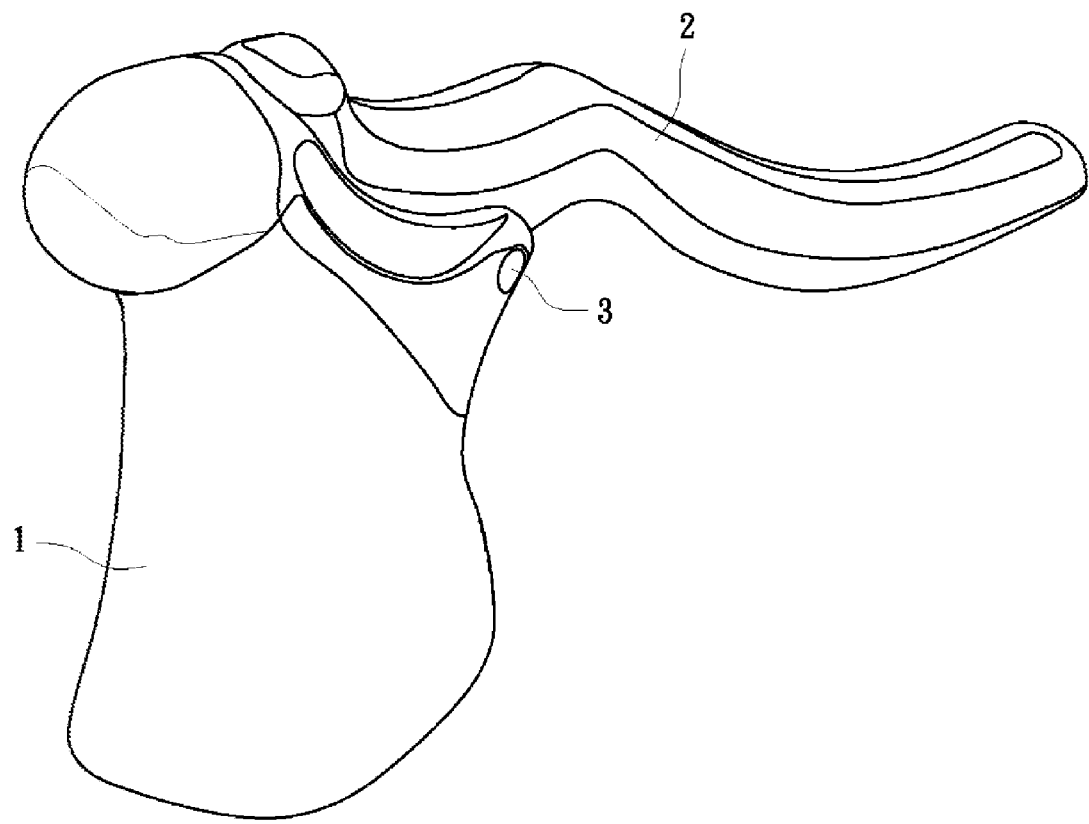
FIG. 2 is another perspective view of the brake lever.
Figure 3:
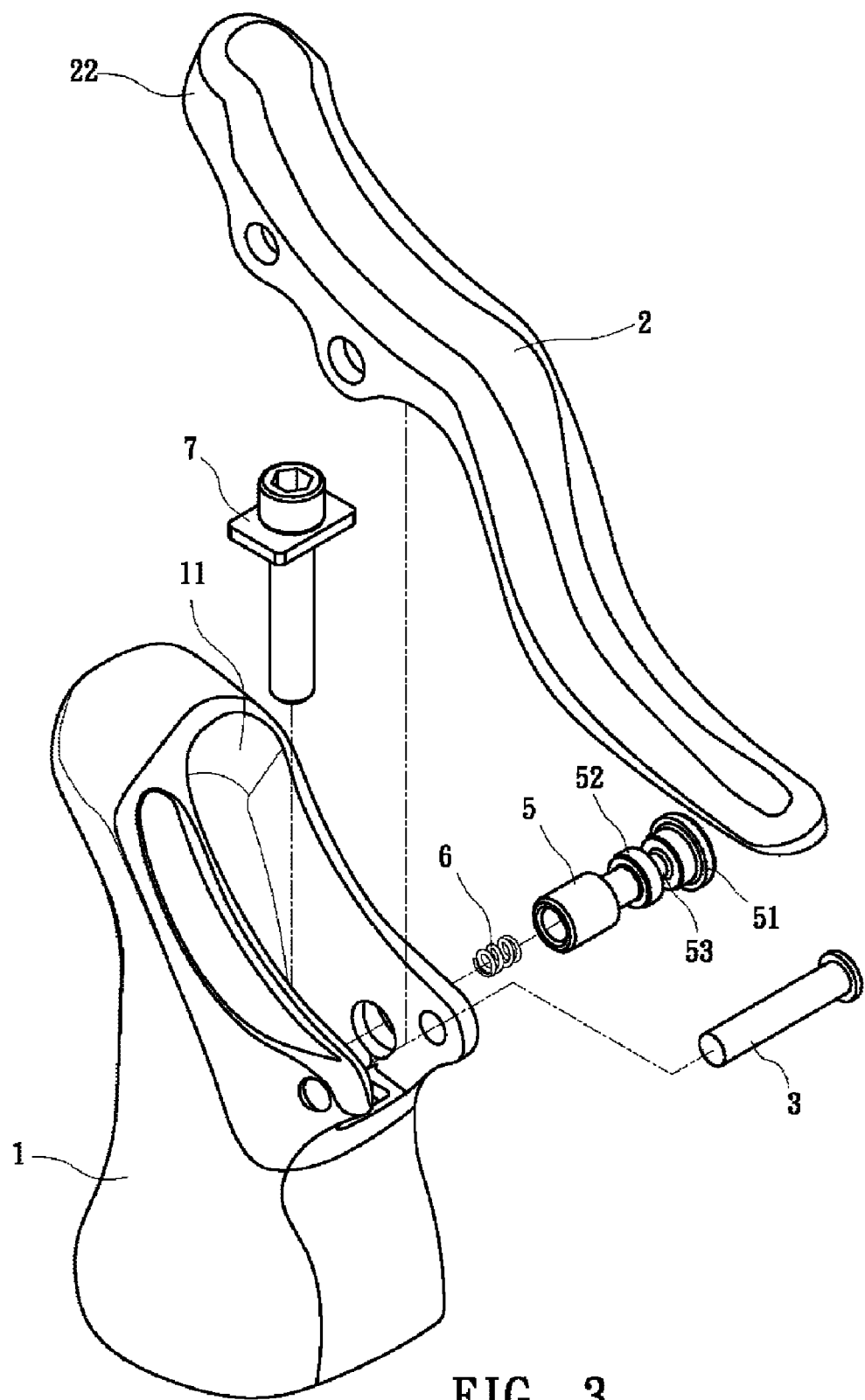
FIG. 3 is an exploded view of FIG. 1.
Figure 4:
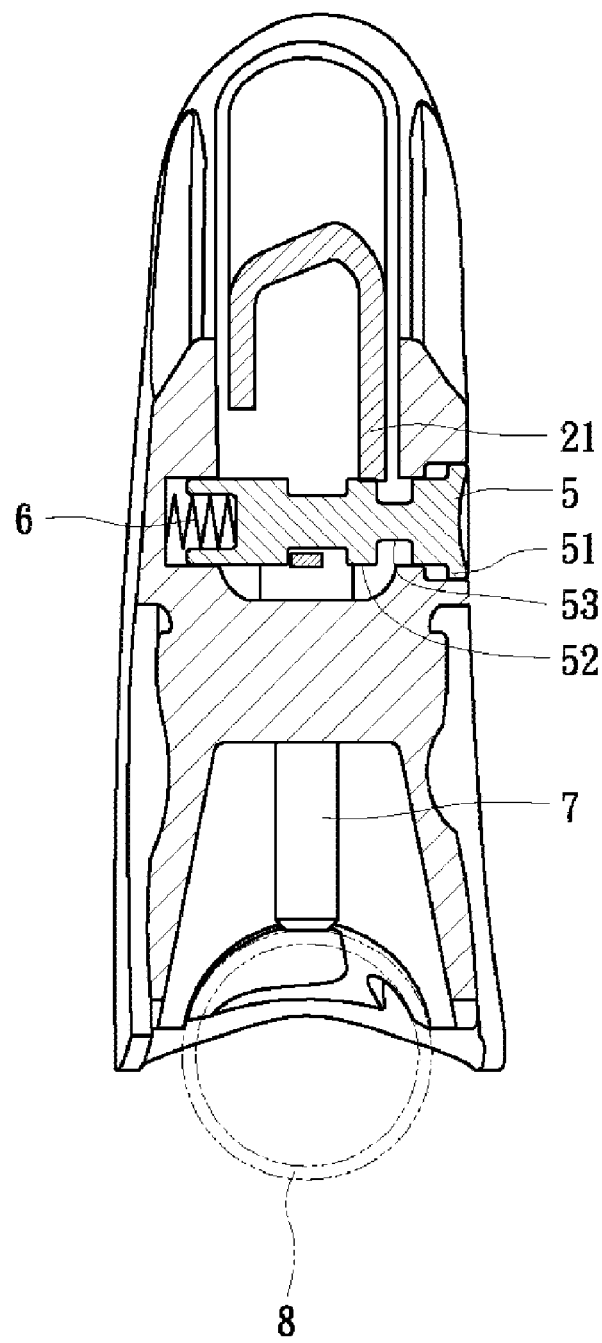
FIG. 4 is a longitudinal sectional view of the brake lever showing a normal position thereof.
Figure 5:
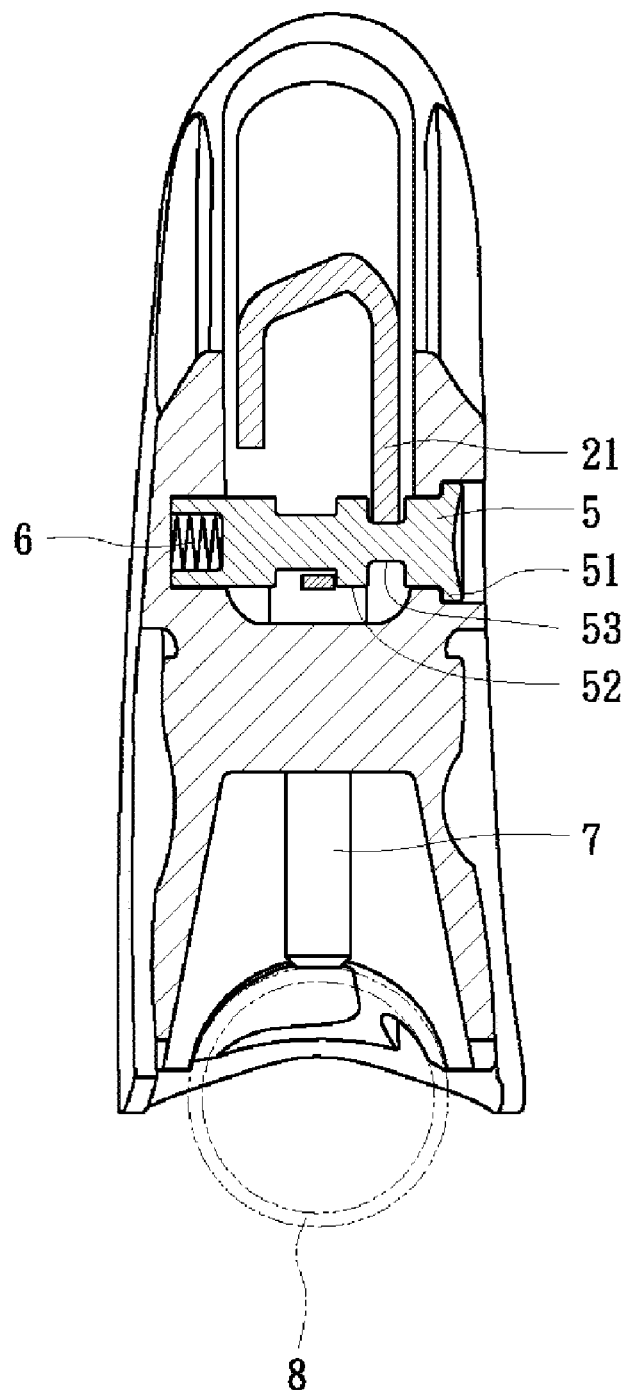
FIG. 5 is a view similar to FIG. 4 showing the detent rod being pushed and locked by the locking member so as to loosen a brake cable such that a distance between two brake pads can be increased for facilitating a subsequent wheel replacement.
Figure 6:
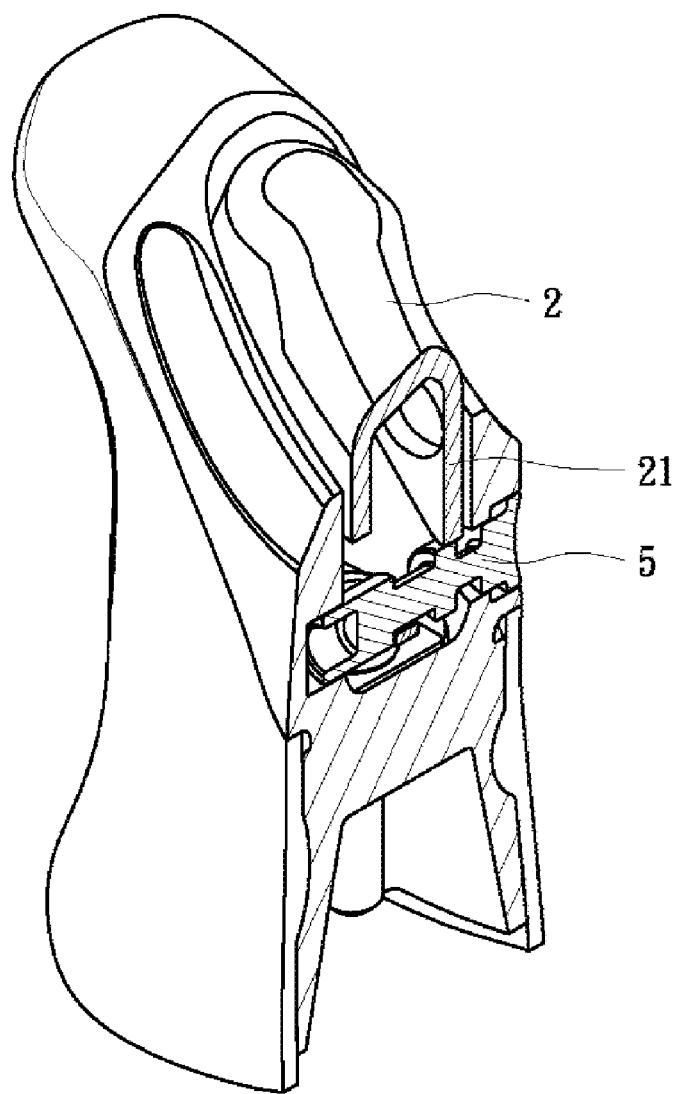
FIG. 6 is a broken away perspective view of the brake lever showing a normal position thereof.
Figure 7:
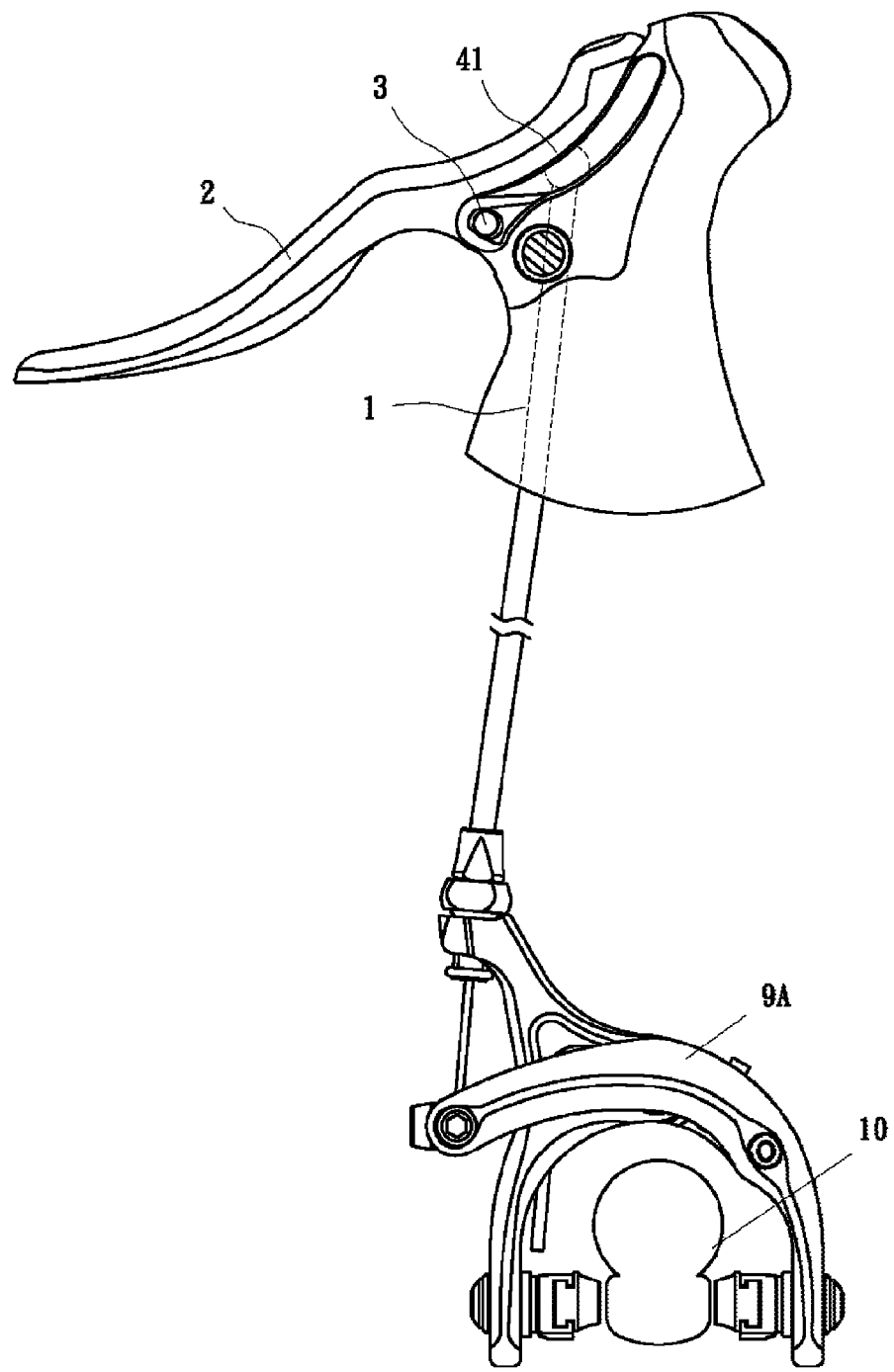
FIG. 7 schematically shows the brake lever and a caliper brake cooperating therewith.
Figure 8:
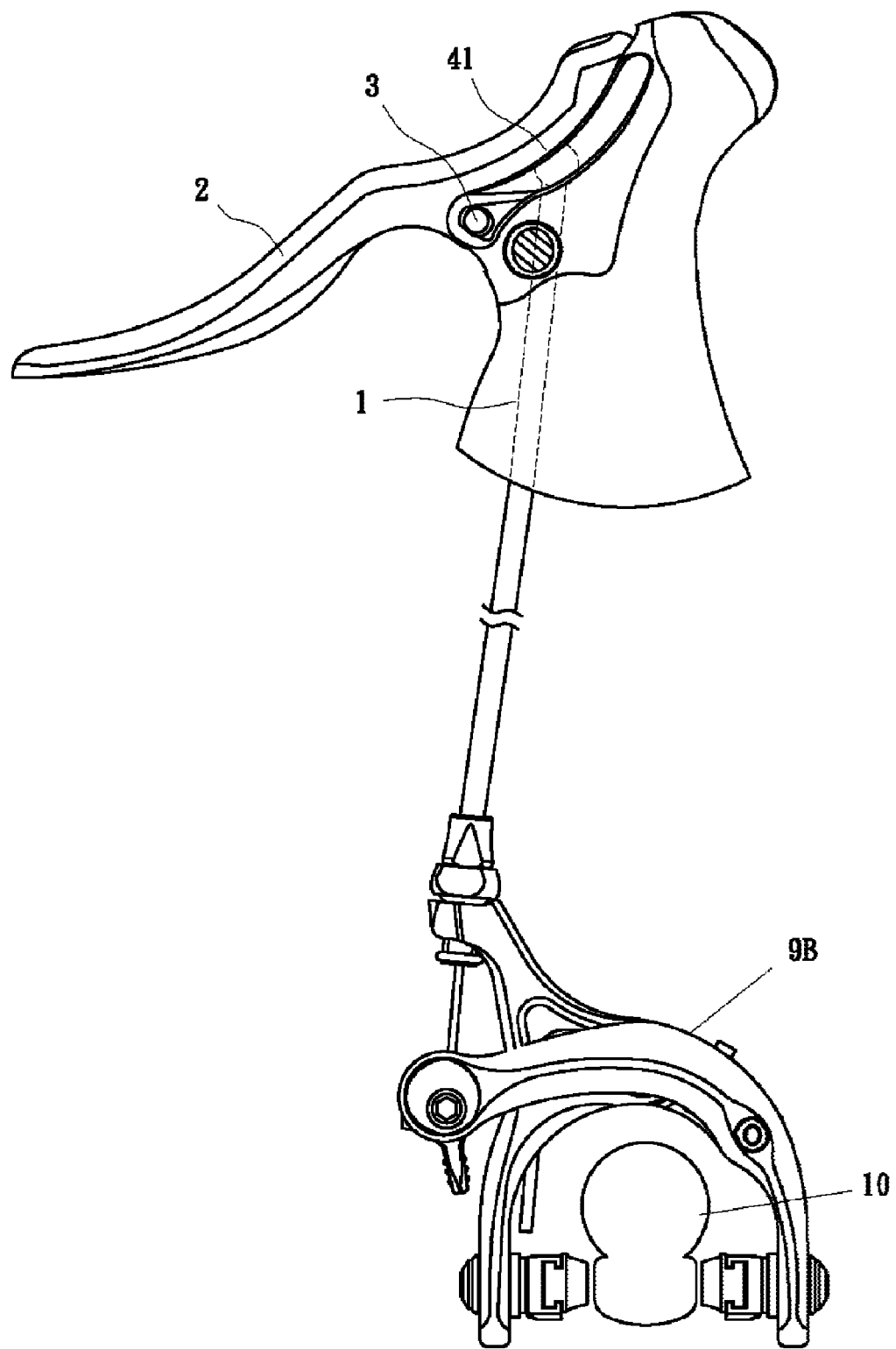
FIG. 8 schematically shows the brake lever and another caliper brake cooperating therewith.

Referring to FIGS. 1 to 8, a brake device of a racing bicycle in accordance with the invention is shown. The brake device comprises the following components as discussed in detail below.

A housing 1 is mounted on handlebars 8 by means of a fastener 7. The housing 1 has a recess 11 therein. A brake lever 2 is pivotably secured to the housing 1 by means of a pivot pin 3. A joining end 22 is pivotably disposed in the recess 11. A detent rod 5 comprises an enlarged head 51 as a push button, an annular flange 52, and an annular groove 53 between the flange 52 and the head 51. The detent rod 5 is inserted through a surface hole (not numbered) of the brake lever 2 into a recessed portion on an inner surface of the brake lever 2. A helical spring 6 is biased between a cylindrical cavity (not numbered) at an inner end of the detent rod 5 and the recessed portion on the inner surface of the brake lever 2. Thus, the detent rod 5 is implemented as a spring depressible member. The head 51 of the detent rod 5 is slightly recessed with respect to the outer surface of the brake lever 2. A locking member 21 in the brake lever 2 is urged against the flange 52 in a normal position.

For replacing a worn or broken wheel 10, a driver may push the head 51 until the end of the locking member 21 falls into the groove 53 to be temporarily fastened. The joining end 22 thus falls into the recess 11 to loosen a brake cable 4 which has one end connected to an internal member (not shown) of the brake lever 2 and the other end attached to a caliper brake 9A (see FIG. 7) or another caliper brake 9B (see FIG. 8). Thereafter, the driver may manually move the brake pads (not numbered) apart until a desired distance between the brake pads for a subsequent wheel 10 replacement is obtained. This brake cable loosening operation can be done by a driver without using tools.

After the wheel replacement, the driver may pivot the brake lever 2 to cause the spring 6 to exert an expansion force to push the head 51 outward until the end of the locking member 21 is urged against the flange 52 again.

While the invention has been described in terms of preferred embodiments, those skilled in the art will recognize that the invention can be practiced with modifications within the spirit and scope of the appended claims.

What is claimed is:

1. A brake apparatus for a racing bicycle, the racing bicycle including handlebars and a brake, the brake apparatus comprising:
    a housing mounted on the handlebars and comprising an internal recess;
    a brake lever pivotably secured to the housing and having one end pivotably disposed in the recess;
    a spring depressible detent rod slidably disposed in the brake lever and comprising a head on an outer surface of the brake lever, an annular flange, and an annular groove between the flange and the head;
    a brake cable having one end attached to the brake lever and the other end attached to the brake; and
    a locking member having one end urged against the flange; whereby pushing the head to cause one end of the locking member to fall into the groove and cause one end of the brake lever to fall into the recess will loosen the brake cable.

* * * * *